United States Patent
Ly et al.

(10) Patent No.: US 11,290,251 B2
(45) Date of Patent: *Mar. 29, 2022

(54) TECHNIQUES FOR UNIFIED SYNCHRONIZATION CHANNEL DESIGN IN NEW RADIO

(71) Applicant: QUALCOMM Incorporated, San Diego, CA (US)

(72) Inventors: Hung Ly, San Diego, CA (US); Tingfang Ji, San Diego, CA (US); Heechoon Lee, San Diego, CA (US); Haitong Sun, Cupertino, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,921

(22) Filed: Jun. 26, 2020

(65) Prior Publication Data

US 2020/0328873 A1 Oct. 15, 2020

Related U.S. Application Data

(63) Continuation of application No. 16/363,723, filed on Mar. 25, 2019, which is a continuation of application
(Continued)

(51) Int. Cl.
*H04L 7/04* (2006.01)
*H04L 7/10* (2006.01)
(Continued)

(52) U.S. Cl.
CPC .......... *H04L 7/042* (2013.01); *H04J 11/0086* (2013.01); *H04L 5/001* (2013.01);
(Continued)

(58) Field of Classification Search
CPC .......... H04W 72/0453; H04W 72/0493; H04L 7/042; H04L 7/06; H04L 7/10;
(Continued)

(56) References Cited

U.S. PATENT DOCUMENTS 9,526,105 B2    12/2016  Yu et al.
9,820,281 B1    11/2017  Werner et al.
(Continued)

FOREIGN PATENT DOCUMENTS

| WO | 2009084931 A1 | 7/2009 |
| WO | 2014186115 A1 | 11/2014 |
| WO | 2017039372 A1 | 3/2017 |

OTHER PUBLICATIONS

ETRI: "Design of Synchronization Signal for Supporting Different Numerologies in NR", 3GPP TSG RAN WG1 Meeting #86bis, R1-1609394, Lisbon, Portugal, Oct. 10-14, 2016, pp. 1-8.
(Continued)

*Primary Examiner* — Kevin Kim
(74) *Attorney, Agent, or Firm* — Arent Fox LLP

(57) ABSTRACT

Various aspects described herein relate to techniques for synchronization channel design and signaling in wireless communications systems (e.g., a 5th Generation (5G) New Radio (NR) system). In an aspect, a method includes identifying a frequency band supported by a user equipment (UE), identifying one or more frequency locations based on the identified frequency band, and the one or more frequency locations are a subset of synchronization raster points used for synchronization signal transmission. The method further includes searching for at least one synchronization signal based on the one or more identified frequency locations.

30 Claims, 12 Drawing Sheets

Related U.S. Application Data

No. 15/837,871, filed on Dec. 11, 2017, now Pat. No. 10,250,380.

(60) Provisional application No. 62/433,098, filed on Dec. 12, 2016.

(51) Int. Cl.

| | |
|---|---|
| *H04L 7/06* | (2006.01) |
| *H04L 5/00* | (2006.01) |
| *H04W 72/12* | (2009.01) |
| *H04J 11/00* | (2006.01) |
| *H04L 27/26* | (2006.01) |
| *H04W 56/00* | (2009.01) |
| *H04W 48/16* | (2009.01) |

(52) U.S. Cl.
CPC .............. *H04L 5/0098* (2013.01); *H04L 7/06* (2013.01); *H04L 7/10* (2013.01); *H04L 27/2613* (2013.01); *H04L 27/2655* (2013.01); *H04W 48/16* (2013.01); *H04W 56/0015* (2013.01); *H04W 72/1294* (2013.01); *H04L 5/0053* (2013.01)

(58) Field of Classification Search
CPC ... H04L 5/001; H04L 5/0098; H04L 27/2633; H04L 27/2655
See application file for complete search history.

(56) References Cited

U.S. PATENT DOCUMENTS

| | | |
|---|---|---|
| 10,250,380 B2 | 4/2019 | Ly et al. |
| 2012/0113866 A1 | 5/2012 | Tenny et al. |
| 2014/0233457 A1 | 8/2014 | Koutsimanis et al. |
| 2016/0100373 A1 | 4/2016 | Chen |
| 2017/0099126 A1 | 4/2017 | Yoo et al. |
| 2017/0118054 A1 | 4/2017 | Ma et al. |
| 2017/0135052 A1 | 5/2017 | Lei et al. |
| 2017/0142641 A1 | 5/2017 | Palenius et al. |
| 2018/0048436 A1 | 2/2018 | Park et al. |
| 2018/0124727 A1 | 5/2018 | Baldemair et al. |
| 2018/0199341 A1 | 7/2018 | Baldemair et al. |
| 2019/0052503 A1* | 2/2019 | Hayashi ................ H04W 76/27 |
| 2019/0222409 A1 | 7/2019 | Ly et al. |
| 2019/0273597 A1 | 9/2019 | Jiang |

OTHER PUBLICATIONS

International Search Report and Written Opinion—PCT/US2017/065799—ISA/EPO—dated Mar. 26, 2018.
Mediatek Inc: "Discussion on Supported Carrier Bandwidth for Forward Compatible NR design", 3GPP TSG RAN WG1 Meeting #86, R1-167541, Gothenburg, Sweden, Aug. 22-26, 2016, pp. 1-5.
Qualcomm Incorporated: "Single Beam Synchronization Design", 3GPP Draft; R1-1610156, Single Beam Sync Design, 3rd Generation Partnership Project (3GPP), Mobile Competence Centre; 650, Route Des Lucioles F-06921 Sophia-Anti Polls Cedex; France, vol. RAN WG1, No. Lisbon, Portugal; Sep. 10, 2016-Sep. 14, 2016, Oct. 9, 2016 (Oct. 9, 2016), XP051150179, 6 Pages, Retrieved from the Internet: URL: http://www.3gpp.org/ftp/Meetings_ 3GPP_SYNC/RAN1/Docs/ [retrieved on Oct. 9, 2016].
Qualcomm Incorporated: "Sync Numerology Considerations below 6GHz", 3GPP TSG RAN WG1 #87, R1-1613058, Nov. 14-18, 2016 Reno, USA, 5 Pages.
Qualcomm Incorporated: "Sync Numerology Considerations below 6GHz", 3GPP TSG-RAN WG1 #87, R1-1612023, Nov. 14-18, 2016, Reno, USA, 4 Pages.
Qualcomm Incorporated: "Sync Raster Considerations below 6GHz", 3GPP TSG-RAN WG1 #87, R1-1612022, Nov. 14-18, 2016, Reno, USA, 4 Pages.
Qualcomm Incorporated., "Sync Raster Considerations Below 6GHz," 3GPP Draft, 3GPP TSG RAN WG1 Meeting #87, R1-1613057, Des Generation Partnership Project (3GPP). Mobile Competence Centre, 658, Route Des Lucioles, F-06921, Sophia-Antipolis Cedex, France, vol. RAN WG1. No. Reno, USA, Nov. 14, 2016, XP051176977, pp. 1-4.
Samsung., "Discussion on Sync. Signal Considering Forward Compatibility Aspects," 3GPP Draft, 3GPP TSG-RAN WG1 #86, R1-166744, 3rd Generation Partnership Project (3GPP), Mobile Competence Centre, 658 Route Des Lucioles, F-86921, Sophia-Antipolis Cedex, FRA, vol. RAN WG1, No. Gothenburg, Sweden, Aug. 21, 2016, XP851125542, pp. 1-4.
Sharp., "Numerology for DL Synchronization Signal in NR," 3GPP Draft, 3GPP TSG RAN WG1 Meeting #86, R1 -1609875, 3rd Generation Partnership Project (3GPP), Mobile Competence Centre, 650, Route Des Lucioles, F-06921, Sophia-Anti Polls Cedex, France, vol. RAN WG1, No. Lisbon, Portugal, Oct. 9, 2016, XP051149902, pp. 1-4.
European Search Report—EP17825339—Search Authority—City—dated Sep. 23, 2020.
Huawei et al., "Channel Raster and Synchronization Signal Locations", 3GPP Draft; R1-1608847, 3rd Generation Partnership Project (3GPP), Mobile Competence Centre, 650, Route Des Lucioles, F-06921 Sophia-Antipolis Cedex, France, vol. RAN WG1, No. Lisbon, Portugal; Oct. 9, 2016, XP051148901, Retrieved from the Internet: URL:http://www.3gpp.org/ftp/Meetings_3GPP_SYNC/RAN1/Docs/ [retrieved on Oct. 9, 2016], section 2.1, 3 pages.
Samsung: "Carrier Raster and Synchronization Signal Transmission", 3GPP Draft, R1-1612453, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016 (Nov. 13, 2016), XP051176401, 3 pages, Retrieved from the Internet: URL: http://www.3gpp.org/ftp/Meetings_3GPP_SYNC/RAN1/Docs/. [retrieved on Nov. 13, 2016], the whole document.
Taiwan Search Report—TW106143513—TIPO—dated Jan. 20, 2021.

\* cited by examiner

TECHNIQUES FOR UNIFIED SYNCHRONIZATION CHANNEL DESIGN IN NEW RADIO

CROSS-REFERENCE TO RELATED APPLICATION

This application is a Continuation Application of U.S. patent application Ser. No. 16/363,723 filed on Mar. 25, 2019, entitled, "TECHNIQUES FOR UNIFIED SYNCHRONIZATION CHANNEL DESIGN IN NEW RADIO," which is a Continuation Application of U.S. patent application Ser. No. 15/837,871 filed on Dec. 11, 2017, entitled, "TECHNIQUES FOR UNIFIED SYNCHRONIZATION CHANNEL DESIGN IN NEW RADIO," which claims the benefit of the filing date of U.S. Provisional Application Ser. No. 62/433,098, entitled "NEW RADIO (NR) UNIFIED SS/PBCH DESIGN" and filed on Dec. 12, 2016, all of which are expressly incorporated by reference herein in their entirety.

BACKGROUND

Aspects of the present disclosure relate generally to wireless communications, and more particularly, to techniques for synchronization channel design and signaling in wireless communications systems (e.g., a 5th Generation (5G) New Radio (NR) system).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5G NR communications technology, used in a wide range of spectra, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information.

In addition, 5G NR communications technology is part of a continuous mobile broadband evolution promulgated by the Third Generation Partnership Project (3GPP) to meet new requirements associated with latency, reliability, security, scalability (e.g., with Internet of Things (IoT)), and other requirements. Some aspects of 5G NR communications technology may be based on LTE standards. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, lower latency, higher capacity, and better resource utilization, current synchronization signal processing solutions may not provide a desired level of speed or customization for efficient operation. As such, new approaches may be desirable to improve the signaling and synchronization, enhance system reliability, and improve user experience in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, the present disclosure includes a method related to synchronization channel design and signaling in wireless communications is provided. In an aspect, the method includes identifying a frequency band in a subset of frequency bands supported by a user equipment (UE), identifying a synchronization numerology used for the subset of frequency bands, and searching for at least one synchronization signal having the identified synchronization numerology at the identified frequency band.

According to another example, a method related to synchronization channel design and signaling in wireless communications is provided. In an aspect, the method includes identifying a frequency band supported by a UE, identifying one or more frequency locations based on the identified frequency band, and the one or more frequency locations are a subset of synchronization raster points used for synchronization signal transmission. The method further includes searching for at least one synchronization signal based on the one or more identified frequency locations.

In a further aspect, an apparatus for wireless communications is provided that includes a transceiver (e.g., a transmitter and/or a receiver), a memory configured to store instructions, and one or more processors communicatively coupled with the transceiver and the memory. The one or more processors are configured to execute the instructions to perform the operations of the methods described herein. In another aspect, an apparatus for wireless communication is provided that includes means for performing the operations of the methods described herein. In yet another aspect, a computer-readable medium (e.g., a non-transitory computer-readable medium) is provided and includes code executable by one or more processors to perform the operations of the methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
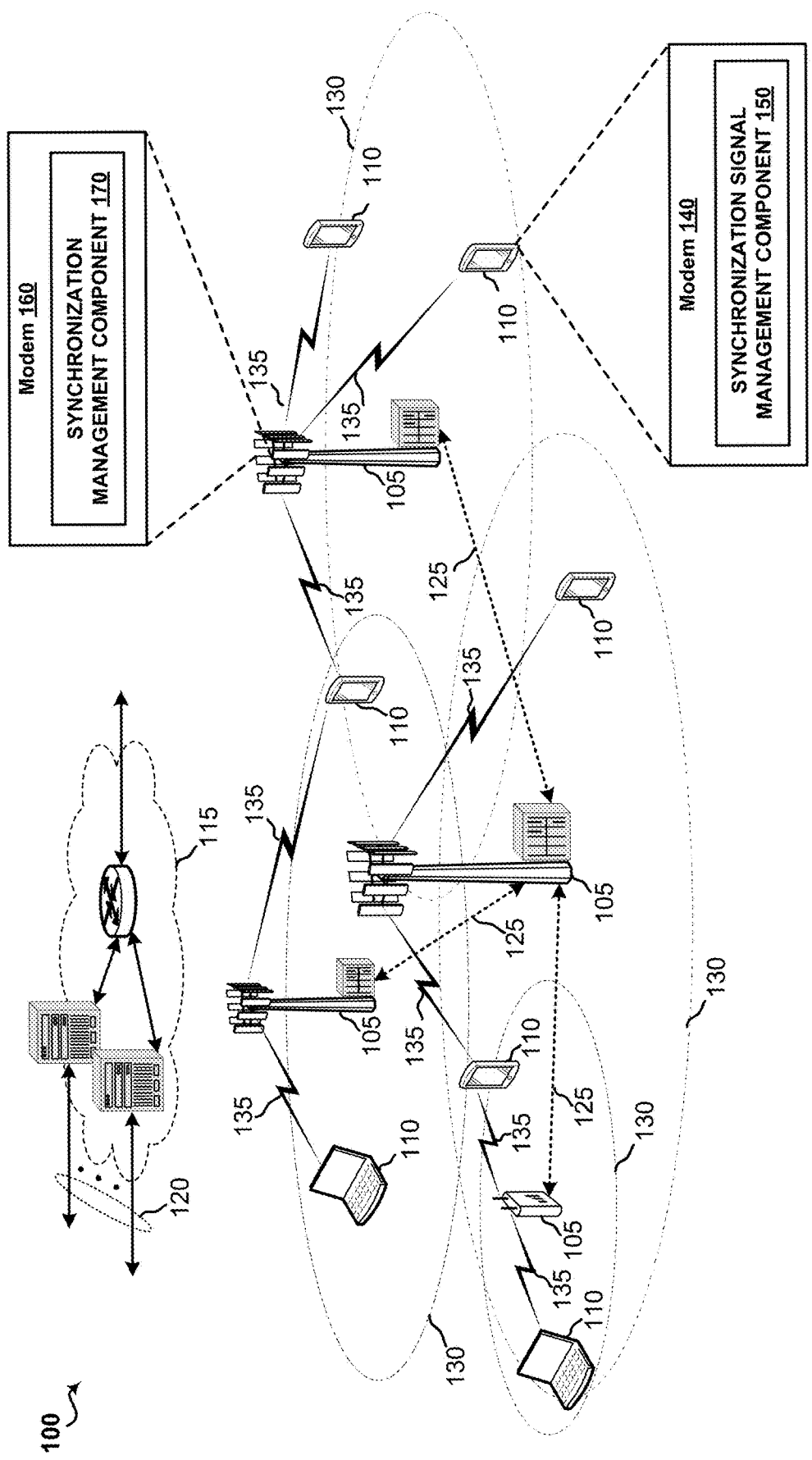
FIG. 1 is a schematic diagram of a wireless communication network including at least one user equipment (UE) or a base station having a synchronization signal management component configured or operated according to one or more of the presently described aspects.

In a wireless communication network, before a user equipment (UE) may communicate with a network, the UE may find and acquire synchronization to one or more cells within the network, which in some examples, may be referred to as a "cell search." In an aspect, the cell search may consist of acquisition of frequency and symbol synchronization to a cell, acquisition of frame timing of the cell and determination of physical-layer cell identity of the cell. Thus, the cell search may enable the UE to acquire physical cell identification (ID), time slot and frame synchronization, which allow the UE to read system information blocks from a particular network. In order to assist the cell search, two special signals are transmitted on each downlink component carrier: primary synchronization signal (PSS) and secondary synchronization signal (SSS). The time-domain positions of the synchronization signals within the frame may differ depending on whether the cell is operating in FDD or TDD. The differences between FDD and TDD in PSS (or SSS) time-domain frame structure allow for the UE to detect duplex mode of the acquired carrier. In some aspects, the UE may search the PSS or SSS by tuning a radio to different frequency channels depending upon which bands the UE supports. However, searching for the synchronization signals may be a resource intensive endeavor.

Accordingly, features of the present disclosure solve the above-identified problem by, for example, implementing techniques or schemes that reduce the time for searching synchronization signals performed by the UE. In some aspects, the UE may search a subset of frequency bands or locations that are identified by the UE. In some examples, the features of the present disclosure may reduce the search latency and/or UE power consumptions at the UE.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Each of the aspects described above are performed or implemented in connection with FIGS. 1-10, which are described in more detail below.

Referring to FIG. 1, in accordance with various aspects of the present disclosure, an example wireless communication network 100 includes at least one UE 110 with a modem 140 having a synchronization signal management component 150 that performs cell search by identifying locations for synchronization signal (e.g., a PSS, an SSS, or a signal over PBCH) based on the band category supported by the UE 110. In some examples, the wireless communication network 100 may include at least one base station 105 with a modem 160 having a synchronization management component 170 that performs synchronization signal (e.g., a PSS, an SSS, or a signal over PBCH) management and signaling based on frequency bands supported by the UE 110. In an example, the synchronization management component 170 may be configured to generate synchronization signals, and transmit the synchronization signals to one or more UE 110.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
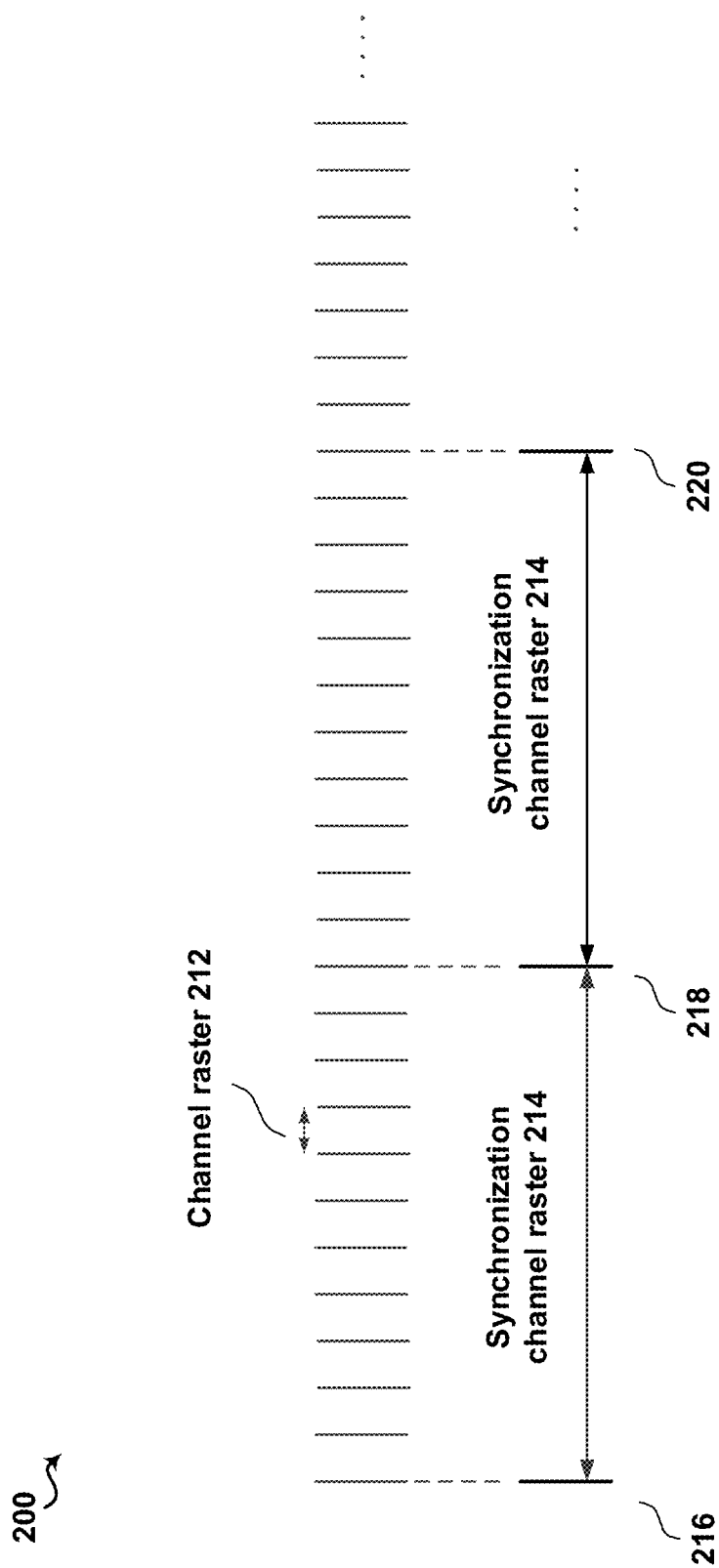
FIG. 2 includes frequency bands having one or more channel raster for possible transmission of synchronization signals and a physical broadcast channel (PBCH), according to one or more of the presently described aspects.

FIG. 2 includes frequency bands 200 having one or more channel raster(s) 212 for possible transmission of synchronization signals and a physical broadcast channel (PBCH). In some aspects, a channel raster 212 may be used to define the channel spacing between two neighboring channels. In some examples, a synchronization channel raster 214 may be used to identify possible frequency locations for transmitting the synchronization signals (e.g., PSS, SSS) or PBCH. In an example, synchronization channel raster 214 may be the channel spacing between frequency location 216 and frequency location 218, and the channel spacing between frequency location 218 and frequency location 220. In this example, each of the frequency locations 216, 218, and 220 indicates a frequency that carries at least a synchronization signal (e.g., PSS, SSS) or PBCH.

Figure 3A:
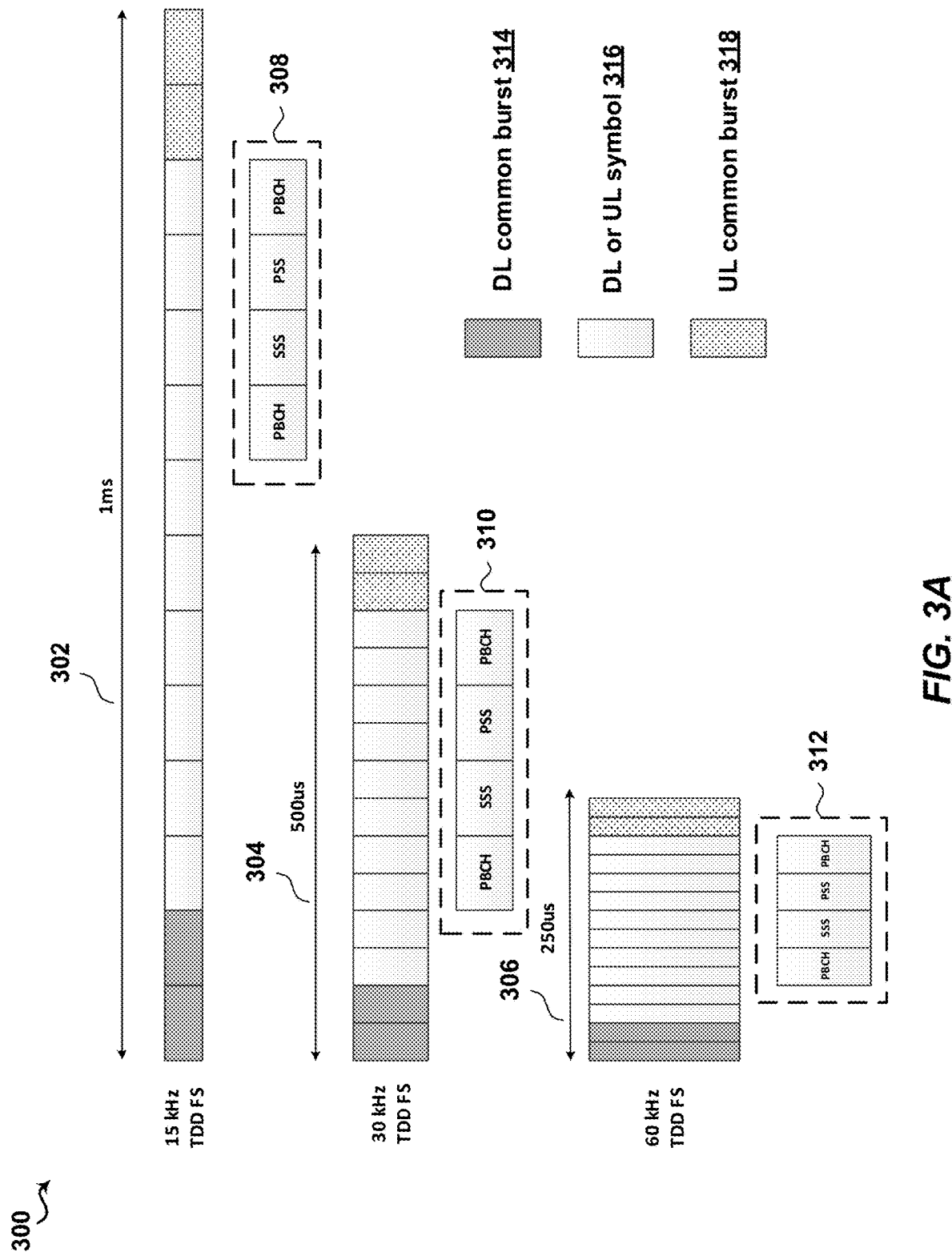
FIG. 3A is a first example of a frame structure scheme for synchronization signals, according to one or more of the presently described aspects.

FIG. 3A is an example of a frame structure scheme 300 for signal synchronization in accordance with aspects of the present disclosure. In an example, a frame structure 302 may include a 1-ms slot in time domain and 15 kHz in frequency domain. The frame structure 302 may be TDD-based, and may include fourteen (14) symbols. In an aspect, within the 14 symbols, there may be two (2) DL common bursts 314 (e.g., in the first 2 symbols), two (2) UL common bursts 318 (e.g., in the last 2 symbols), and ten (10) data or control symbols 316 in the middle (DL or UL) of the frame structure 302. In an aspect, a synchronization signal block 308 may include four (4) symbols for PBCH, SSS, PSS, and PBCH, as shown in FIG. 3A. In this example, the synchronization signal block 308 is at a frequency band in the first band category (e.g., in Table 1), and may have a 2.16 MHz synchronization signal bandwidth with a 15 kHz synchronization numerology or channel spacing.

In another example, a frame structure 304 may include a 500-μs slot in time domain and 30 kHz in frequency domain. The frame structure 304 may be TDD-based, and may include 14 symbols. In an aspect, within the 14 symbols, there may be 2 DL common bursts 314 (e.g., in the first 2 symbols), 2 UL common bursts 318 (e.g., in the last 2 symbols), and 10 data or control symbols 316 in the middle (DL or UL) of the frame structure 304. In an aspect, a synchronization signal block 310 may include eight (8) symbols for PBCH (2 symbols), SSS (2 symbols), PSS (2 symbols), and PBCH (2 symbols), as shown in FIG. 3A. In this example, the synchronization signal block 310 may be at a frequency band in the first band category (e.g., in Table 1), and may have a 2.16 MHz synchronization signal bandwidth with a 15 kHz synchronization numerology or channel spacing.

In an example, a frame structure 306 may include a 250-μs slot in time domain and 60 kHz in frequency domain. The frame structure 306 may be TDD-based, and may include 14 symbols. In an aspect, within the 14 symbols, there may be 2 DL common bursts 314 (e.g., in the first 2 symbols), 2 UL common bursts 318 (e.g., in the last 2 symbols), and 10 data or control symbols 316 in the middle (DL or UL) of the frame structure 312. In an aspect, a synchronization signal block 312 may include 8 symbols for PBCH (2 symbols), SSS (2 symbols), PSS (2 symbols), and PBCH (2 symbols), as shown in FIG. 3A. In this example, the synchronization signal block 312 may be at a frequency band in the second band category (e.g., in Table 1), and may have a 4.32 MHz synchronization signal bandwidth with a 30 kHz synchronization numerology or channel spacing.

In some aspects, design parameters for synchronization channel design and signaling based on different frequency bands of the present disclosure are in accordance with Table 1 below. In an aspect, the frame structure scheme 300 may use one or more parameters in Table 1. For example, the synchronization signal block 308 or 310 may use one or more parameters in the first band category (e.g., 2.16 MHz synchronization signal bandwidth with 15 kHz synchronization numerology), and the synchronization signal block 312 may use one or more parameters in the second band category (e.g., 4.32 MHz synchronization signal bandwidth with 30 kHz synchronization numerology). In some examples, each frequency band may use a respective synchronization numerology. In some cases, a 60 kHz frame structure (FS) (e.g., the frame structure 306) may be defined with a minimum system bandwidth of 10 MHz only for the second band category.

TABLE 1

Design parameters for synchronization channel design and signaling based on two different frequency bands

| Design parameters | 1$^{st}$ Band Category | 2$^{nd}$ Band Category |
|---|---|---|
| Min. system bandwidth (MHz) | 5 | 10 |
| Sync channel raster (MHz) | 1.8 | 3.6 |
| Sync bandwidth limit (MHz) | 2.7 | 5.4 |
| Sync bandwidth (MHz) | 2.16 | 4.32 |
| Sync numerology (kHz) | 15 | 30 |
| Number of tones for SS | 128 | 128 |
| Number of tones for PBCH | 128 | 128 |
| Number of PSS symbols | 1 | 1 |
| Number of SSS symbols | 1 (dual port) | 1 (dual port) |
| Number of PBCH symbols | 2 (dual port) | 2 (dual port) |
| PBCH DMRS | SSS | SSS |

In an aspect, a method of wireless communications including techniques for minimizing synchronization signal search performed by a UE (e.g., UE 110). In some aspects, the UE may search a subset of frequency bands based on the band category supported by the UE. In contrast to conventional methods of performing "blind searching," features of the present disclosure allow the UE to perform a limited or reduced searches for the synchronization signals based on the frequency bands supported or identified by the UE. In a non-limiting example, two band categories may be provided (e.g., a first band category and a second band category in Table 1). In an example, the first category may consist of frequency bands which support the deployments with a minimum system bandwidth of 5 MHz. The second band category may consist of frequency bands which support the deployments with a minimum system bandwidth of at least 10 MHz.

Accordingly, in an aspect, if the UE belongs to the first band category in Table 1, the UE may only search for synchronization signals or PBCHs with a first synchronization numerology (e.g., 15 kHz). In another aspect, if the band belongs to the second band category, the UE may only search for synchronization signals or PBCHs with a second synchronization numerology (e.g., 30 kHz). In some examples, the first band category may include data or control channel numerology of 15 kHz or 30 kHz. In some cases, for the second band category, the data or control channel numerology may be one or multiples of 15 kHz (e.g., 15 kHz, 30 kHz, or 60 kHz).

In another example, for the first band category, synchronization signal locations may be specified in the specification of a wireless communication standard. Alternatively, in another example, a synchronization channel raster may be equal to or larger than a channel raster. In some cases, a synchronization channel raster is used to define possible frequency locations for transmitting the synchronization signals or PBCHs.

In an aspect, for the second band category in Table 1, the synchronization channel raster may be a baseline synchronization channel raster (e.g., at least 3.6 MHz). In another aspect, for bands with wide frequency bandwidths (e.g., 5 GHz band with 700 MHz available bandwidth), the synchronization channel raster may be decimated to have a larger synchronization channel raster than the baseline synchronization channel raster. For example, a frequency band having a frequency bandwidth that is larger than a minimum channel bandwidth (e.g., 5 MHz) may be considered as having a wide frequency bandwidth (e.g., 10 or 20 MHz). In some aspects, the decimation factor may be specified in the specification of a wireless communications standard.

In yet another example, different UE categories for different synchronization signal or PBCH design may be provided. For example, UE category 1 may support synchronization signal or PBCH design for the first band category only. In this case, the network (or a base station) may send the first band category synchronization signal or PBCH only. UE category 2 may support synchronization signal or PBCH design for the second band category only. As such, the network may send the second band category synchronization signal or PBCH only. In yet further example, the UE category 3 may support synchronization signal or PBCH design for both first band category and second band category. In some examples, the network may send both first band category synchronization signal or PBCH and band category synchronization signal or PBCH to the UE.

In accordance with a first implementation, the UE (e.g., UE 110) may not perform blind searching of the entire frequency band. Instead, for example, if the determined or identified frequency band belongs to the first band category, the UE may only search for synchronization signals or PBCHs with 15 kHz synchronization numerology. In another example, if the determined or identified frequency band belongs to the second band category, the UE may only search for synchronization signals or PBCHs with 30 kHz synchronization numerology. In some examples, for the first band category, the data or control channel numerology may be 15 kHz or 30 kHz. In some cases, for the second band category, the data or control channel numerology may be 15 kHz, 30 kHz, or 60 kHz.

In some aspects, the parameters configurations may vary based on the various band categories as illustrated in Table 2 below. In some examples, SSS and PBCH may be on the same ports. In some cases, PSS may be not necessarily on the same ports as SSS or PBCH.

In accordance with a second implementation, supplementary synchronization locations may be identified. Particularly, for the first band category (e.g., frequency bands with minimum system bandwidth of 5 MHz), the UE (e.g., UE 110) may perform synchronization signal or PBCH search based on one of two options. In the first option, the synchronization channel raster may be equal to a channel raster. In the second option, the synchronization frequency locations may be specified in the specification of a wireless communications standard. In some examples, when the synchronization signal or channel bandwidth is close to the minimum channel bandwidth, only a subset of synchronization raster points may be selected for synchronization signal transmission. In some cases, selecting a subset of synchronization raster points for synchronization signal transmission may reduce the search latency and/or UE power consumption at the UE. In some cases, the subset of synchronization raster points is known to both the network (e.g., a base station 105) and the UE (e.g., a UE 110).

In an aspect, for the second band category, the synchronization channel raster may be at least 3.6 MHz (or a baseline synchronization raster). In an example, to locate or identify supplementary synchronization locations, for frequency bands with wide frequency bandwidth, e.g., 5 GHz band with about 700 MHz available bandwidth, the synchronization raster points (e.g., defined based on the baseline synchronization raster) may be decimated to have a larger synchronization raster, for example, a larger synchronization raster than the baseline synchronization raster. In some examples, the minimum channel bandwidth and synchronization signal/channel bandwidth may be identified or determined by the UE 110. The upper bound of the synchronization raster may be the difference between the minimum channel bandwidth and synchronization signal/channel bandwidth. In some cases, the synchronization raster may be equal to the minimum channel bandwidth (e.g., 5 MHz). In some examples, for some frequency bands with a minimum channel bandwidth larger than 5 MHz, the decimation may be performed or configured. In some examples, the decimation factor may be specified in the specification of a wireless communications standard.

In some examples, the parameter values for the first implementation and second implementation may be as defined in Table 3 below.

TABLE 2

Design parameters for synchronization channel design and signaling based on three different frequency bands

| Design parameters | Below 6 GHz (1st Band Cat.) | Below 6 GHz (2nd Band Cat.) | Above 6 GHz |
|---|---|---|---|
| Min. system bandwidth (MHz) | 5 | 10 | 80 |
| Sync channel raster (MHz) | 1.8 | 3.6 | 36 |
| Sync bandwidth upperbound (MHz) | 2.7 | 5.4 | 36 |
| Sync bandwidth (MHz) | 2.16 | 4.32 | 34.56 |
| Sync numerology (kHz) | 15 | 30 | 240 |
| Number of tones for SS | 128 | 128 | 128 |
| Number of tones for PBCH | 128 | 128 | 128 |
| Number of PSS symbols | 1 | 1 | 1 |
| Number of SSS symbols | 1 (dual port) | 1 (dual port) | 1 (dual port) |
| Number of PBCH symbols | 2 (dual port SFBC) | 2 (dual port SFBC) | 2 (dual port SFBC) |
| PBCH DMRS | SSS | SSS | SSS |
| SS periodicity (ms) | 5 | 5 | 5 |
| PBCH TH (ms) | 40 (repeat every 10 ms) | 40 (repeat every 10 ms) | 40 |
| MIB size (including 16 bits CRC) (bits) | 40 | 40 | >40 |

TABLE 3

Design parameters for searching synchronization
frequency locations

| Design parameters | 1st Band Category | 2nd Band Category |
|---|---|---|
| Min. system bandwidth (MHz) | 5 | 10 |
| Sync channel raster (MHz) | Predetermined | 3.6 |
| Sync bandwidth limit (MHz) | Predetermined | 5.4 |
| Sync bandwidth (MHz) | | 4.32 |
| Sync numerology (kHz) | | 30 |
| Number of tones for SS | | 128 |
| Number of tones for PBCH | | 128 |
| Number of PSS symbols | | 1 |
| Number of SSS symbols | | 1 (dual port) |
| Number of PBCH symbols | | 2 (dual port) |
| PBCH DMRS | | SSS |
| SS periodicity (ms) | | 5 |
| PBCH TH (ms) | | 40 (repeat every 10 ms) |
| MIB size (including 16 bits CRC) (bits) | | 40 |

Figure 3B:
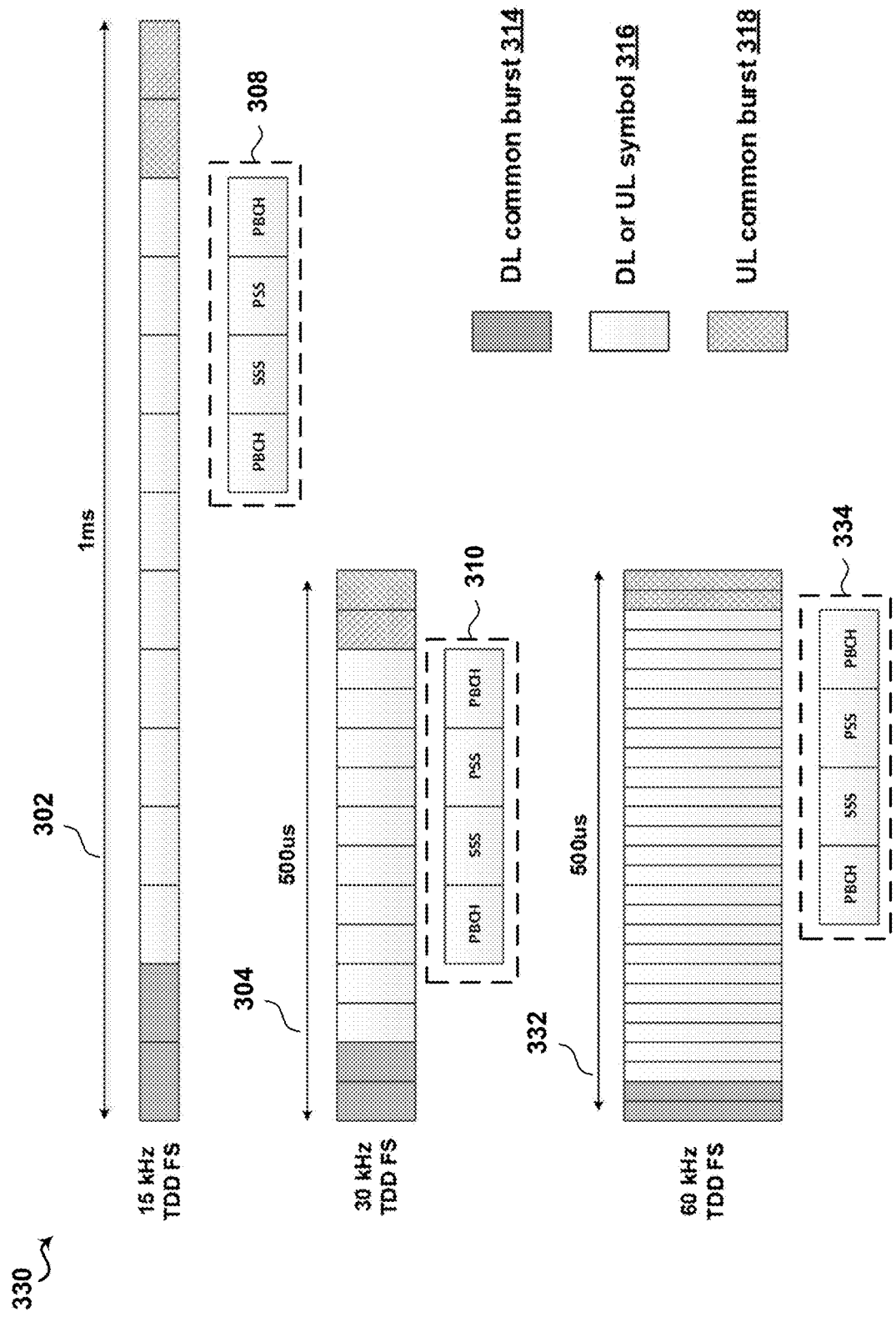
FIG. 3B is a second example of a frame structure scheme for synchronization signals, according to one or more of the presently described aspects.

FIG. 3B is an example of a frame structure scheme 330 for signal synchronization in accordance with a third implementation of the present disclosure. In an aspect, one or more synchronization signals or PBCHs may be included in 15 kHz with slot bundling as shown in FIG. 3B. In an example, similar to the frame structure scheme 300, a frame structure 302 may include a 1-ms slot in time domain and 15 kHz in frequency domain. The frame structure 302 may be TDD-based, and may include 14 symbols. In an aspect, within the 14 symbols, there may be 2 DL common bursts 314 (e.g., in the first 2 symbols), 2 UL common bursts 318 (e.g., in the last 2 symbols), and 10 data or control symbols 316 in the middle (DL or UL) of the frame structure 302. In an aspect, a synchronization signal block 308 may include 4 symbols for PBCH, SSS, PSS, and PBCH, as shown in FIG. 3B. In this example, the synchronization signal block 308 may be at a frequency band that below 6 GHz, and may have 2.16 MHz synchronization signal bandwidth with 15 kHz synchronization numerology or channel spacing (e.g., see parameters in Table 4).

In another example, similar to the frame structure scheme 300, a frame structure 304 may include a 500-μs slot in time domain and 30 kHz in frequency domain. The frame structure 304 may be TDD-based, and may include 14 symbols. In an aspect, within the 14 symbols, there may be 2 DL common bursts 314 (e.g., in the first 2 symbols), 2 UL common bursts 318 (e.g., in the last 2 symbols), and 10 data or control symbols 316 in the middle (DL or UL) of the frame structure 304. In an aspect, a synchronization signal block 310 may include 8 symbols for PBCH (2 symbols), SSS (2 symbols), PSS (2 symbols), and PBCH (2 symbols), as shown in FIG. 3B. In this example, the synchronization signal block 310 may be at a frequency band that below 6 GHz, and may have 2.16 MHz synchronization signal bandwidth with 15 kHz synchronization numerology or channel spacing (e.g., see parameters in Table 4).

In an example, a frame structure 332 may include a 500-μs slot in time domain and 60 kHz in frequency domain. The frame structure 332 may be TDD-based, and may include two (2) regular slots, where each slot has fourteen (14) symbols. In an aspect, the frame structure 332 may include a combined slot with two (2) or more regular slots. In this example, two (2) regular 14-symbol slots are combined or bundled, and the 500-μs slot with the frame structure 332 includes twenty-eight (28) symbols (e.g., 28 OFDM symbols). In an aspect, within the 28 symbols, there may be 2 DL common bursts 314 (e.g., in the first 2 symbols), 2 UL common bursts 318 (e.g., in the last 2 symbols), and twenty-four (24) data or control symbols 316 in the middle (DL or UL) of the 500-μs slot with the frame structure 332. In some cases, there are no DL or UL common bursts in the middle of the slot with the frame structure 332. In this example, no DL or UL common bursts in the middle of the slot that has 500 μs in time domain and 60 kHz in frequency domain. In an aspect, a synchronization signal block 334 may include sixteen (16) symbols for PBCH (4 symbols), SSS (4 symbols), PSS (4 symbols), and PBCH (4 symbols), as shown in FIG. 3B. In this example, the synchronization signal block 312 may be at a frequency band that below 6 GHz, and may have 2.16 MHz synchronization signal bandwidth with 15 kHz synchronization numerology or channel spacing (e.g., see parameters in Table 4).

In some examples, the parameters for the third implementation may be in accordance with Table 4:

TABLE 4

Design parameters for synchronization channel design
and signaling at frequency bands below 6 GHz

| Design parameters | Below 6 GHz |
|---|---|
| Min. system bandwidth (MHz) | 5 |
| Sync channel raster (MHz) | 1.8 |
| Sync bandwidth limit (MHz) | ≤2.7 |
| Sync bandwidth (MHz) | 2.16 |
| Sync numerology (kHz) | 15 |
| Number of tones for SS | 128 |
| Number of tones for PBCH | 128 |
| Number of PSS symbols | 1 |
| Number of SSS symbols | 1 (dual port) |
| Number of PBCH symbols | 2 (dual port) |
| PBCH DMRS | SSS |

In some examples, one or more synchronization signals or PBCHs may have a respective synchronization numerology with slot bundling as shown in Table 5. For example, the design parameters for the synchronization signals or PBCHs that are below 6 GHz band may be different than the parameters used for above 6 GHz as illustrated in Table 5. In an example, SSS and PBCH may be on the same ports. In an aspect, PSS may not be necessarily on the same ports as SSS or PBCH.

TABLE 5

Design parameters for synchronization channel design
and signaling (below and above 6 GHz band)

| Design parameters | Band Below 6 GHz | Band Above 6 GHz |
|---|---|---|
| Min. system bandwidth (MHz) | 5 | 80 |
| Sync channel raster (MHz) | 1.8 | 36 |
| Sync bandwidth upperbound (MHz) | 2.7 | 36 |

TABLE 5-continued

Design parameters for synchronization channel design
and signaling (below and above 6 GHz band)

| Design parameters | Band Below 6 GHz | Band Above 6 GHz |
|---|---|---|
| Sync bandwidth (MHz) | 2.16 | 34.56 |
| Sync numerology (kHz) | 15 | 240 |
| Number of tones for SS | 128 | 128 |
| Number of tones for PBCH | 128 | 128 |
| Number of PSS symbols | 1 | 1 |
| Number of SSS symbols | 1 (dual port) | 1 (dual port) |
| Number of PBCH symbols | 2 (dual port SFBC) | 2 (dual port SFBC) |
| PBCH DMRS | SSS | SSS |
| SS periodicity (ms) | 5 | 5 |
| PBCH TTI (ms) | 40 (repeat every 10 ms) | 40 |
| MIB size (including 16 bits CRC) (bits) | 40 | >40 |

Figure 3C:
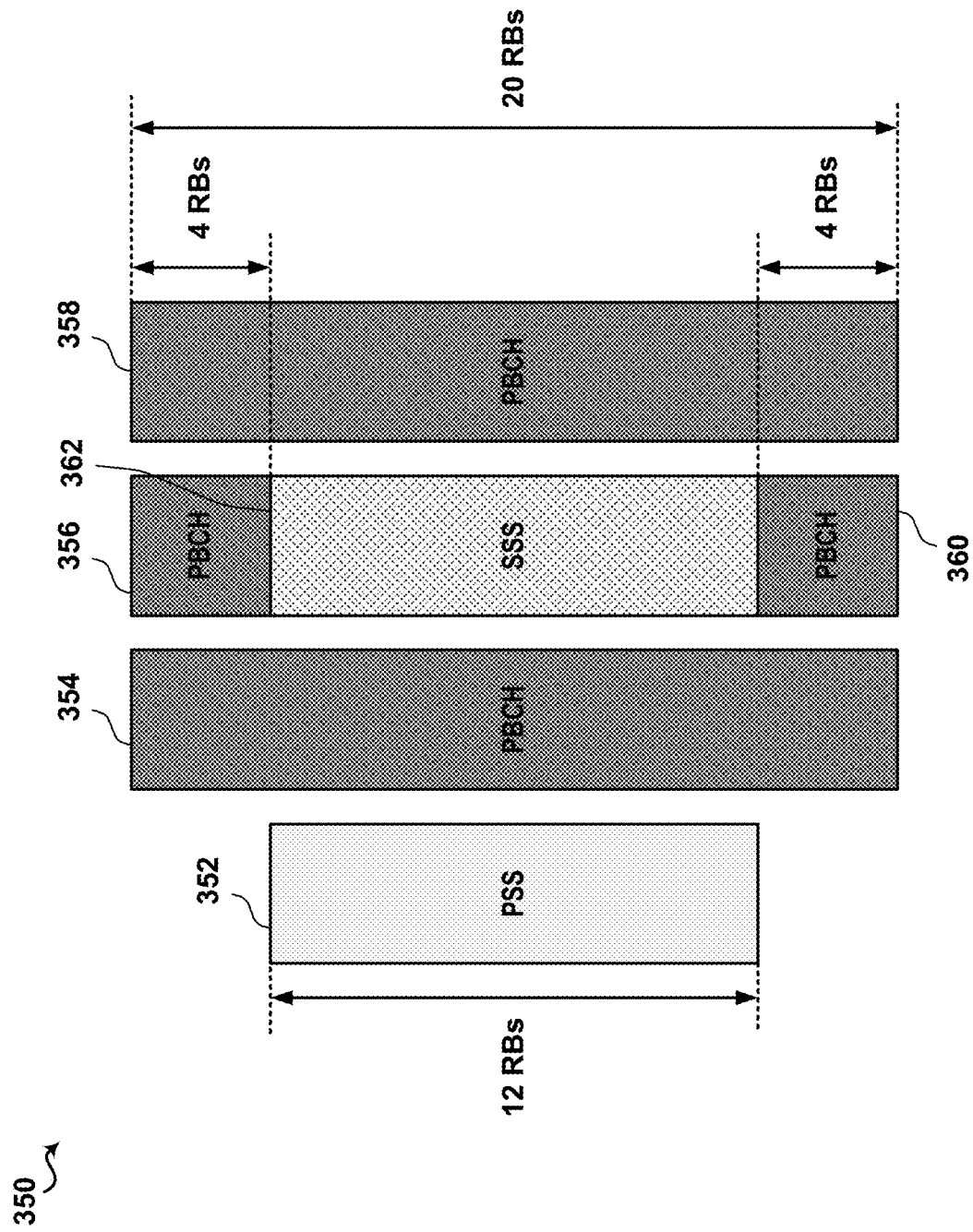
FIG. 3C is an example of a synchronization signal block, according to one or more of the presently described aspects.

FIG. 3C is an example of a synchronization channel structure 350 in accordance with the implementations of the present disclosure. In an aspect, a synchronization signal block (e.g., synchronization signal block 308, 310, 312, or 334) may include a PSS 352 (12 resource blocks (RBs)), a PBCH 354 (20 RBs), a PBCH 356 (4 RBs), a PBCH 360 (4 RBs), a PBCH 358 (20 RBs), and an SSS 362 (12 RBs), as shown in FIG. 3C. In this example, the synchronization signal block may be at a frequency band. In an aspect, a synchronization channel raster (e.g., synchronization channel raster 214) may be used to identify possible frequency locations for transmitting or searching for the synchronization signal block which includes one or more synchronization signals (e.g., PSS, SSS) or PBCH, for example, PSS 352, PBCH 354, PBCH 356, PBCH 360, PBCH 358, and/or SSS 362.

Figure 4:
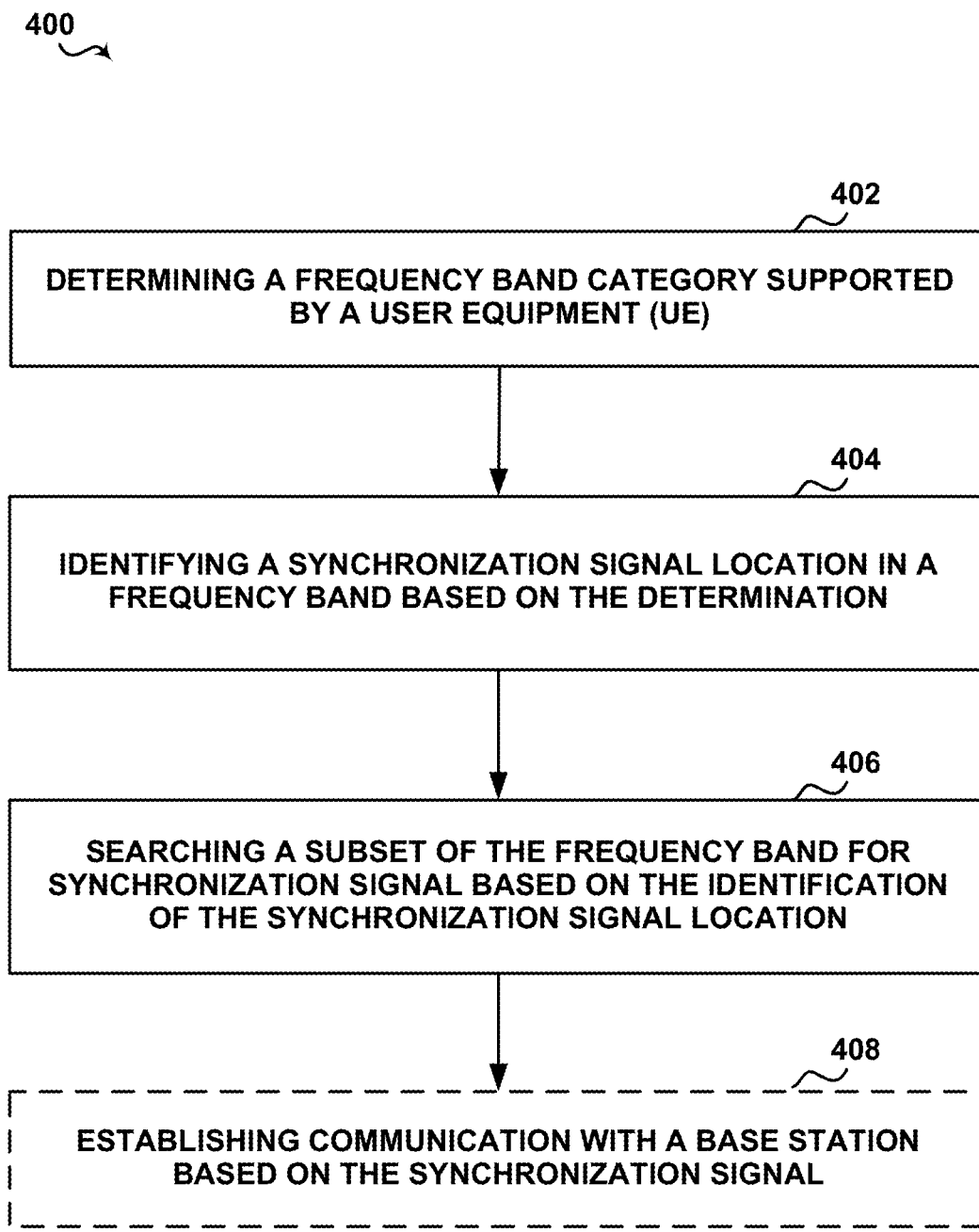
FIG. 4 is a flow diagram of an example method performed by a UE for searching for synchronization signals in a subset of frequency bands, according to one or more of the presently described aspects.

FIG. 4 is a flow diagram of an example of a method 400 of the present disclosure for searching a subset of frequency bands. The method 400 may be performed by a UE 110 and more particularly by the synchronization signal management component 150 described with reference to FIGS. 1 and 9. For example, one or more of the processors 912, the memory 916, the modem 140, the synchronization signal management component 150, frequency band component 152, signal searching component 154, synchronization numerology component 156, and/or frequency location component 158, may be configured to perform aspects of the method 400.

At block 402, the method 400 may include determining a frequency band category supported by a UE. In an aspect, for example, along with one or more of the processors 912, the memory 916, the modem 140, and/or the transceiver 902, the synchronization signal management component 150, and/or frequency band component 152 may be configured to determine a frequency band category supported by the UE.

At block 404, the method 400 may include identifying a synchronization signal (e.g., PSS or SSS) location in a frequency band based on the determination. In an aspect, for example, along with one or more of the processors 912, the memory 916, the modem 140, and/or the transceiver 902, the synchronization signal management component 150, frequency band component 152, and/or frequency location component 158 may be configured to identify a synchronization signal (e.g., PSS or SSS) or PBCH location based on the frequency band determined at block 402.

At block 406, the method 400 may include searching a subset of the frequency band for synchronization signal based on the identification of the synchronization signal location. In an aspect, for example, along with one or more of the processors 912, the memory 916, the modem 140, and/or the transceiver 902, the synchronization signal management component 150, frequency band component 152, signal searching component 154, and/or frequency location component 158 may be configured to search a subset of the frequency band used for synchronization signal(s) based on the synchronization signal location identified at block 404.

At block 408, the method 400 may optionally include establishing communication with a base station based on the synchronization signal. In an aspect, for example, along with one or more of the processors 912, the memory 916, the modem 140, and/or the transceiver 902, the synchronization signal management component 150 may be configured to establish communications with a base station based on the synchronization signal.

Figure 5:
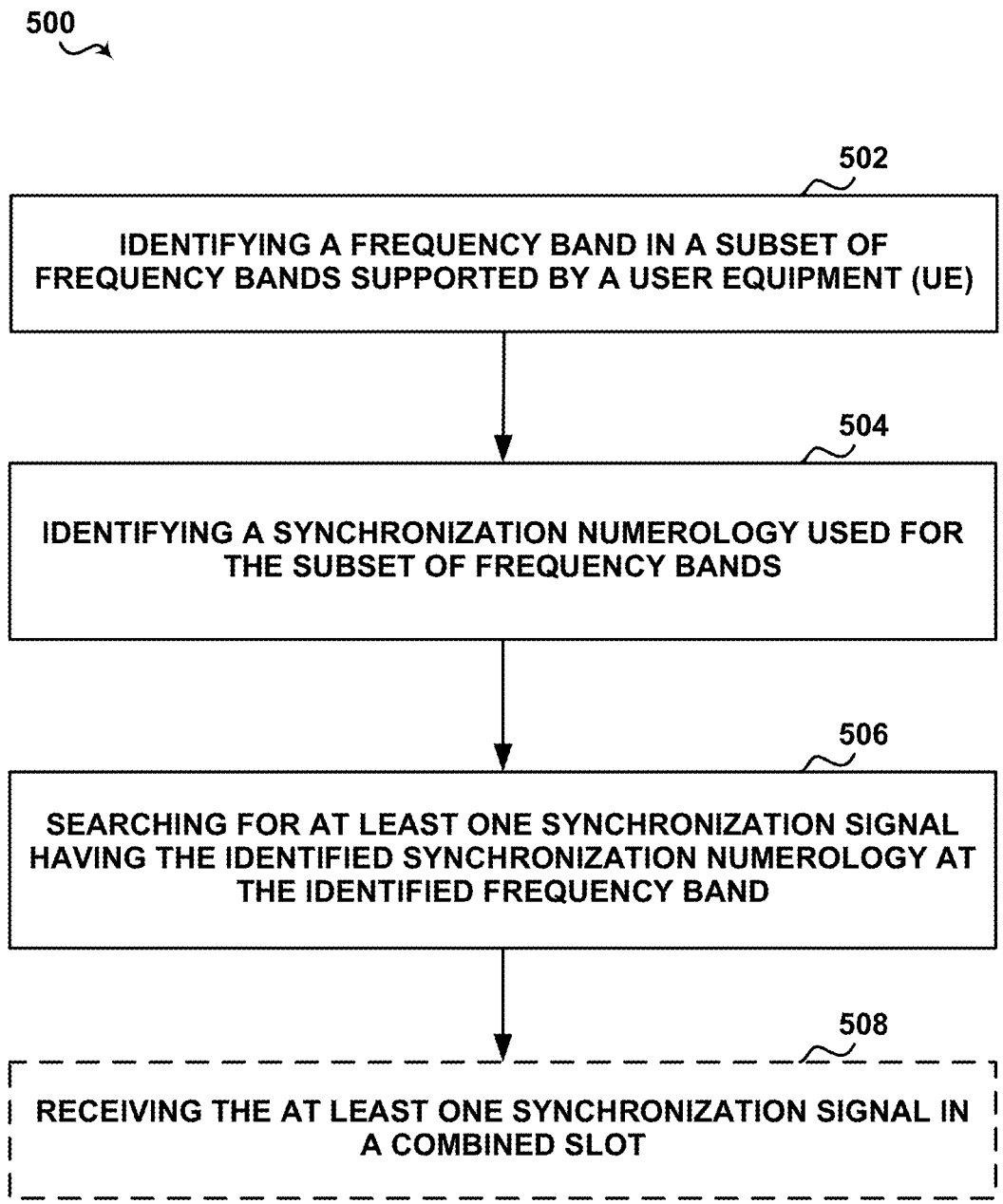
FIG. 5 is a flow diagram of a first example method performed by a UE for synchronization channel design and signaling, according to one or more of the presently described aspects.

FIG. 5 is a flow diagram of an example method 500 of the present disclosure for synchronization channel design and signaling. The method 500 may be performed by a UE 110 and more particularly by the synchronization signal management component 150 described with reference to FIGS. 1 and 9. For example, one or more of the processors 912, the memory 916, the modem 140, the synchronization signal management component 150, frequency band component 152, signal searching component 154, synchronization numerology component 156, and/or frequency location component 158, may be configured to perform aspects of the method 500.

At block 502, the method 500 may include identifying a frequency band in a subset of frequency bands supported by a UE. In an aspect, for example, along with one or more of the processors 912, the memory 916, the modem 140, and/or the transceiver 902, the synchronization signal management component 150, and/or frequency band component 152 may be configured to identify or determine a frequency band in a subset of frequency bands that are supported by the UE 110.

At block 504, the method 500 may include identifying a synchronization numerology used for the subset of frequency bands. In an aspect, for example, along with one or more of the processors 912, the memory 916, the modem 140, and/or the transceiver 902, the synchronization signal management component 150, frequency band component 152, and/or synchronization numerology component 156 may be configured to identify a synchronization numerology used for the frequency band identified at block 502 and/or the subset of frequency bands supported by the UE 110.

At block 506, the method 500 may include searching for at least one synchronization signal having the identified synchronization numerology at the identified frequency band. In an aspect, for example, along with one or more of the processors 912, the memory 916, the modem 140, and/or the transceiver 902, the synchronization signal management component 150, and/or signal searching component 154, may be configured to search for or detect one or more synchronization signals based on the synchronization numerology (identified at block 504) at the frequency band (identified at block 502). In some examples, a synchronization signal may be a PSS, an SSS, or a signal transmitted on a PBCH.

At block 508, the method 500 may optionally include receiving the at least one synchronization signal in a combined slot. In an aspect, for example, along with one or more of the processors 912, the memory 916, the modem 140, and/or the transceiver 902, the synchronization signal management component 150 may be configured to receive, via the transceiver 902, one or more synchronization signals in a combined slot. In an example, the combined slot may include two or more slots without at least a downlink common burst or an uplink common burst between the two or more slots.

Figure 6:
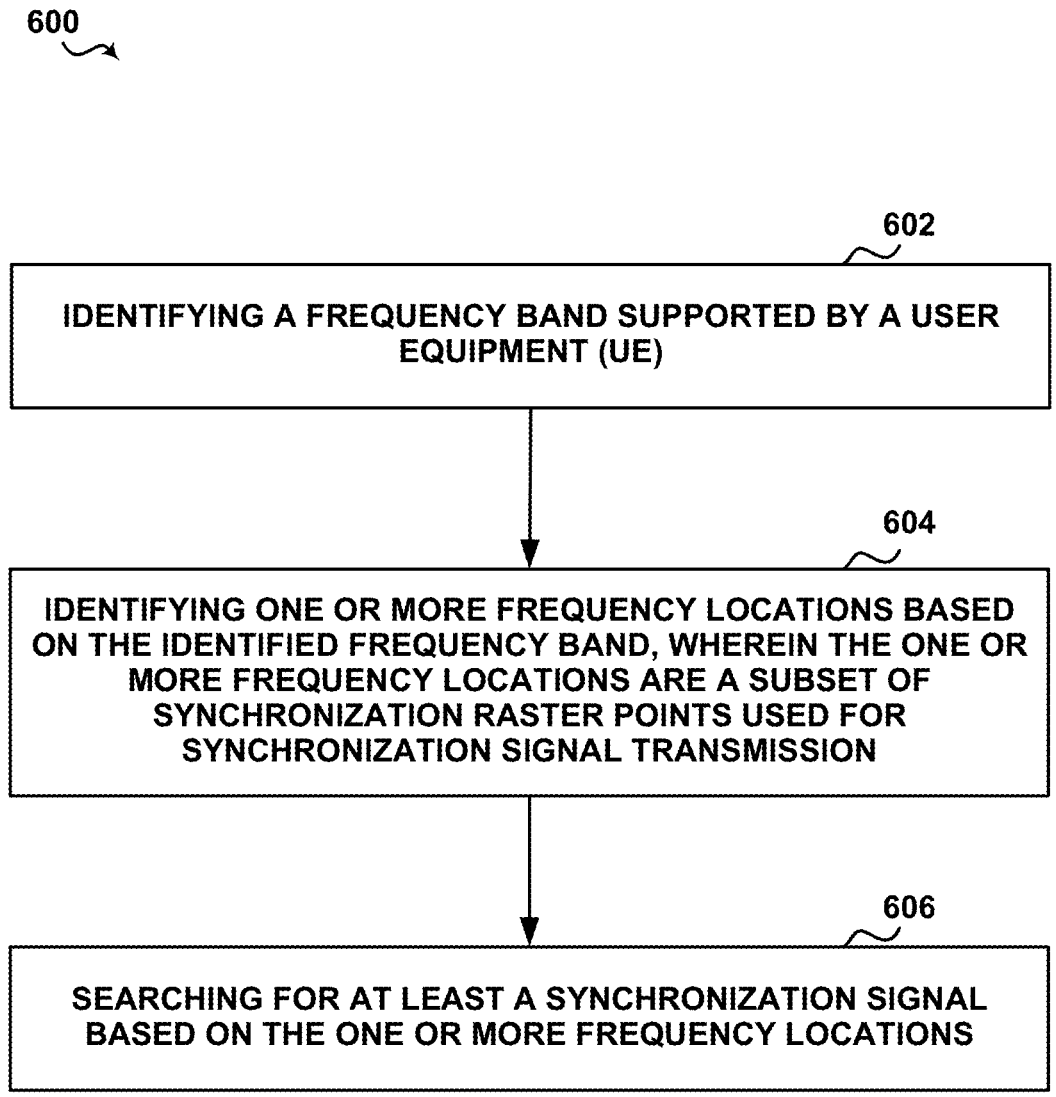
FIG. 6 is a flow diagram of a second example method performed by a UE for synchronization channel design and signaling according to one or more of the presently described aspects.

FIG. 6 is a flow diagram of an example method 600 of the present disclosure for synchronization channel design and signaling. The method 600 may be performed by a UE 110 and more particularly by the synchronization signal management component 150 described with reference to FIGS. 1 and 9. For example, one or more of the processors 912, the memory 916, the modem 140, the synchronization signal management component 150, frequency band component 152, signal searching component 154, synchronization numerology component 156, and/or frequency location component 158, may be configured to perform aspects of the method 600.

At block 602, the method 600 may include identifying a frequency band supported by a UE. In an aspect, for example, along with one or more of the processors 912, the memory 916, the modem 140, and/or the transceiver 902, the synchronization signal management component 150, and/or frequency band component 152 may be configured to determine or identify a frequency band supported by the UE 110.

At block 604, the method 600 may include identifying one or more frequency locations based on the identified frequency band, wherein the one or more frequency locations are a subset of synchronization raster points used for synchronization signal transmission. In an aspect, for example, along with one or more of the processors 912, the memory 916, the modem 140, and/or the transceiver 902, the synchronization signal management component 150, frequency band component 152, and/or frequency location component 158 may be configured to determine or identify one or more frequency locations based on the frequency band determined at block 602. In an example, the one or more frequency locations are in a subset of synchronization raster points used for synchronization signal transmission.

At block 606, the method 600 may include searching for at least one synchronization signal based on the one or more identified frequency locations. In an aspect, for example, along with one or more of the processors 912, the memory 916, the modem 140, and/or the transceiver 902, the synchronization signal management component 150, signal searching component 154, and/or frequency location component 158 may be configured to search for one or more synchronization signals based on the one or more frequency locations that are determined or identified at block 604. In some examples, a synchronization signal may be a PSS, an SSS, or a signal transmitted on a PBCH.

Figure 7:
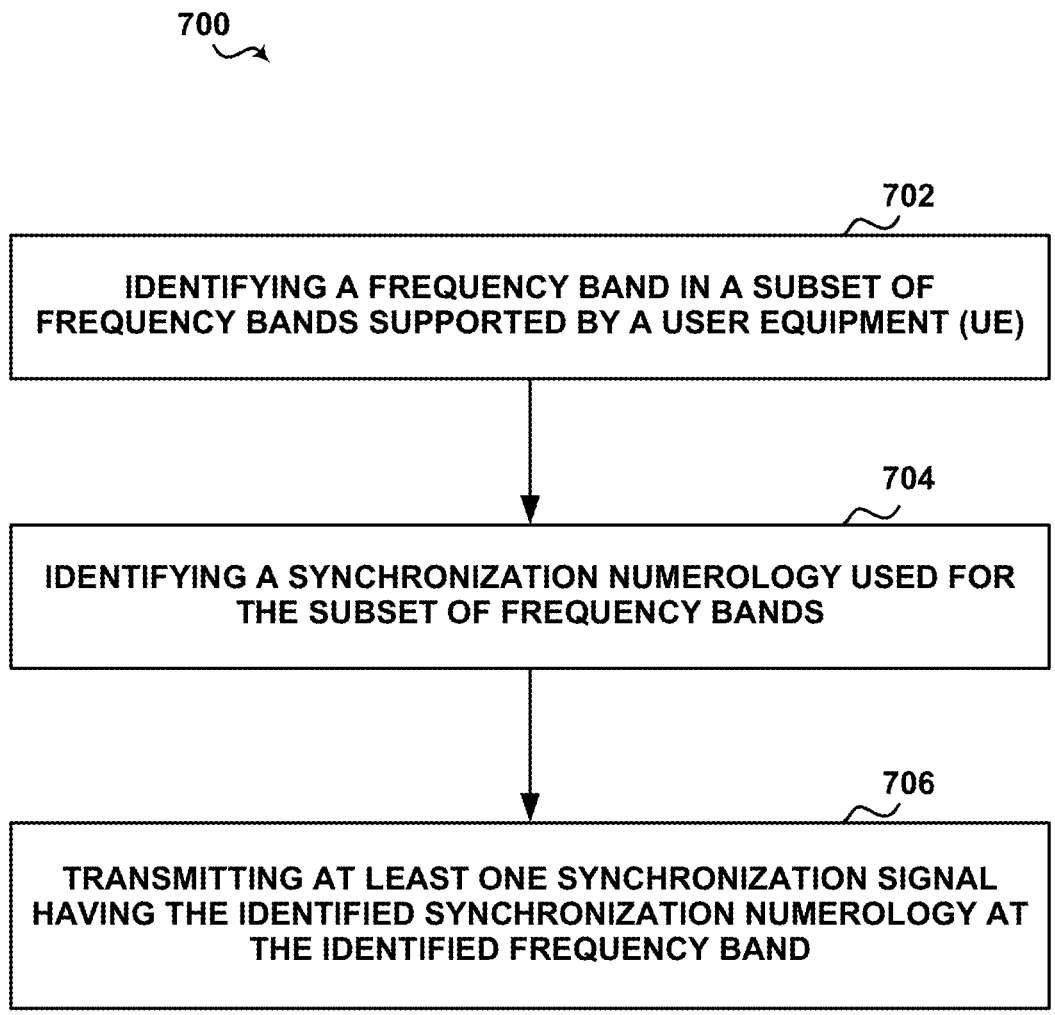
FIG. 7 is a flow diagram of a first example method performed by a base station for synchronization channel design and signaling, according to one or more of the presently described aspects.

FIG. 7 is a flow diagram of an example method 700 of the present disclosure for synchronization channel design and signaling. The method 700 may be performed by a base station 105 and more particularly by the synchronization management component 170 described with reference to FIGS. 1 and 10. For example, one or more of the processors 1012, the memory 1016, the modem 160, the synchronization management component 170, frequency band component 172, synchronization numerology component 174, and/or frequency location component 176, may be configured to perform aspects of the method 700.

At block 702, the method 700 may include identifying a frequency band in a subset of frequency bands supported by a UE. In an aspect, for example, along with one or more of the processors 1012, the memory 1016, the modem 160, and/or the transceiver 1002, the synchronization management component 170, and/or frequency band component 172 may be configured to identify or determine a frequency band in a subset of frequency bands that are supported by the UE 110.

At block 704, the method 700 may include identifying a synchronization numerology used for the subset of frequency bands. In an aspect, for example, along with one or more of the processors 1012, the memory 1016, the modem 160, and/or the transceiver 1002, the synchronization management component 170, frequency band component 172, and/or synchronization numerology component 174 may be configured to identify a synchronization numerology used for the frequency band identified at block 702 and/or the subset of frequency bands supported by the UE 110.

At block 706, the method 700 may include transmitting at least one synchronization signal having the identified synchronization numerology at the identified frequency band. In an aspect, for example, along with one or more of the processors 1012, the memory 1016, the modem 160, and/or the transceiver 1002, the synchronization management component 170 may be configured to transmit, via the transceiver 1002, one or more synchronization signals based on the synchronization numerology (identified at block 704) at the frequency band (identified at block 702). In some examples, a synchronization signal may be a PSS, an SSS, or a signal transmitted on a PBCH. In some cases, the at least one synchronization signal is transmitted in a combined slot. In an aspect, for example, along with one or more of the processors 1012, the memory 1016, the modem 160, and/or the transceiver 1002, the synchronization management component 170 may be configured to transmit, via the transceiver 1002, one or more synchronization signals in a combined slot. In an example, the combined slot may include two or more slots without at least a downlink common burst or an uplink common burst between the two or more slots.

Figure 8:
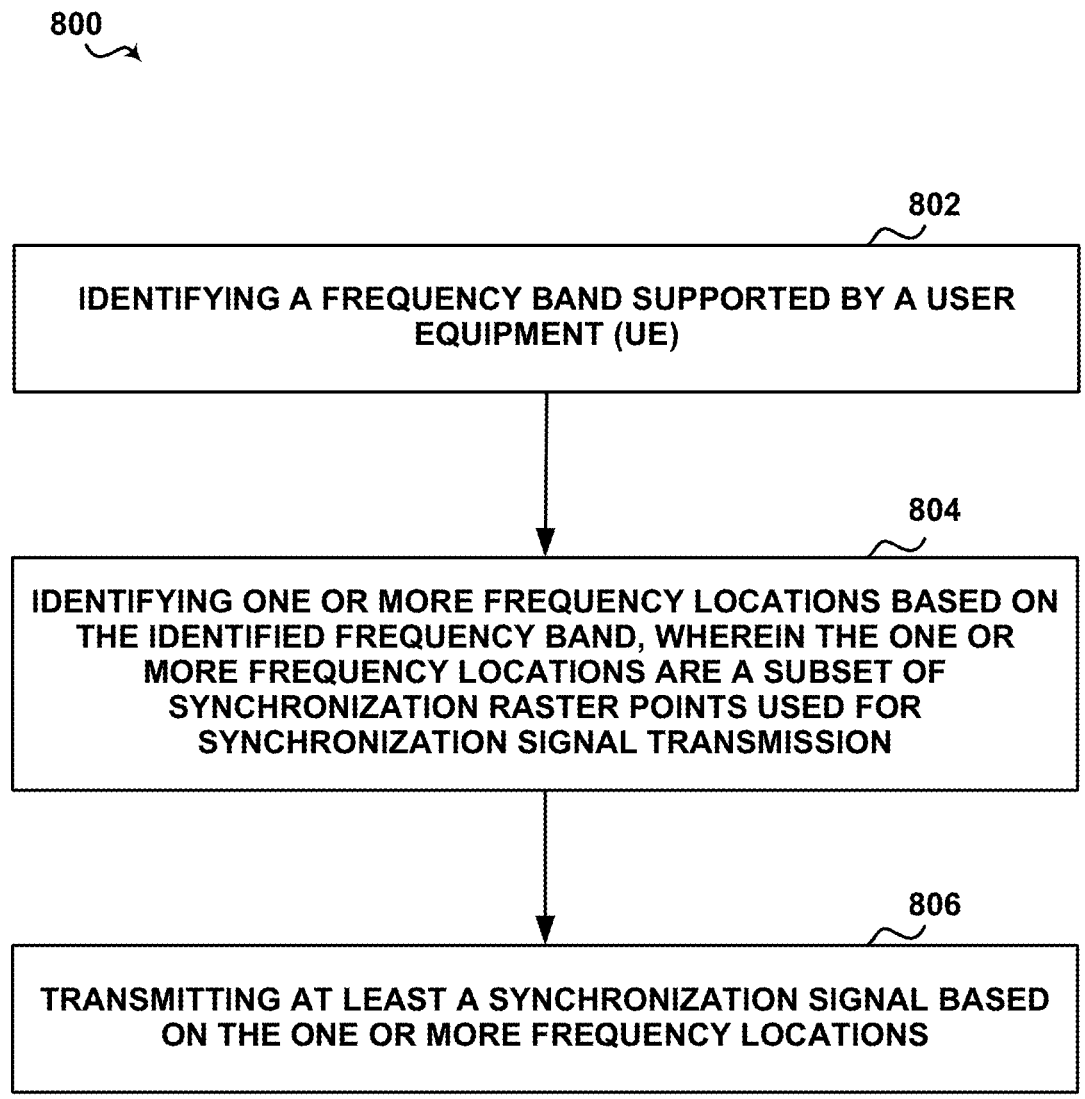
FIG. 8 is a flow diagram of a second example method performed by a base station for synchronization channel design and signaling, according to one or more of the presently described aspects.

FIG. 8 is a flow diagram of an example method 800 of the present disclosure for synchronization channel design and signaling. The method 800 may be performed by base station 105 and more particularly by the synchronization management component 170 described with reference to FIGS. 1 and 10. For example, one or more of the processors 1012, the memory 1016, the modem 160, the synchronization management component 170, frequency band component 172, synchronization numerology component 174, and/or frequency location component 176, may be configured to perform aspects of the method 800.

At block 802, the method 800 may include identifying a frequency band supported by a UE. In an aspect, for example, along with one or more of the processors 1012, the memory 1016, the modem 160, and/or the transceiver 1002, the synchronization management component 170, and/or frequency band component 172 may be configured to determine or identify a frequency band supported by the UE 110.

At block 804, the method 800 may include identifying one or more frequency locations based on the identified frequency band, wherein the one or more frequency locations are a subset of synchronization raster points used for synchronization signal transmission. In an aspect, for example, along with one or more of the processors 1012, the memory 1016, the modem 160, and/or the transceiver 1002, the synchronization management component 170, frequency band component 172, and/or frequency location component 176 may be configured to determine or identify one or more frequency locations based on the frequency band determined at block 802. In an example, the one or more frequency locations are in a subset of synchronization raster points used for synchronization signal transmission.

At block 806, the method 800 may include transmitting at least one synchronization signal based on the one or more identified frequency locations. In an aspect, for example, along with one or more of the processors 1012, the memory 1016, the modem 160, and/or the transceiver 1002, the synchronization management component 170, and/or frequency location component 176 may be configured to transmit, via the transceiver 1002, one or more synchronization signals based on (or over) the one or more frequency locations that are determined or identified at block 804. In some examples, a synchronization signal may be a PSS, an SSS, or a signal transmitted on a PBCH.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 9:
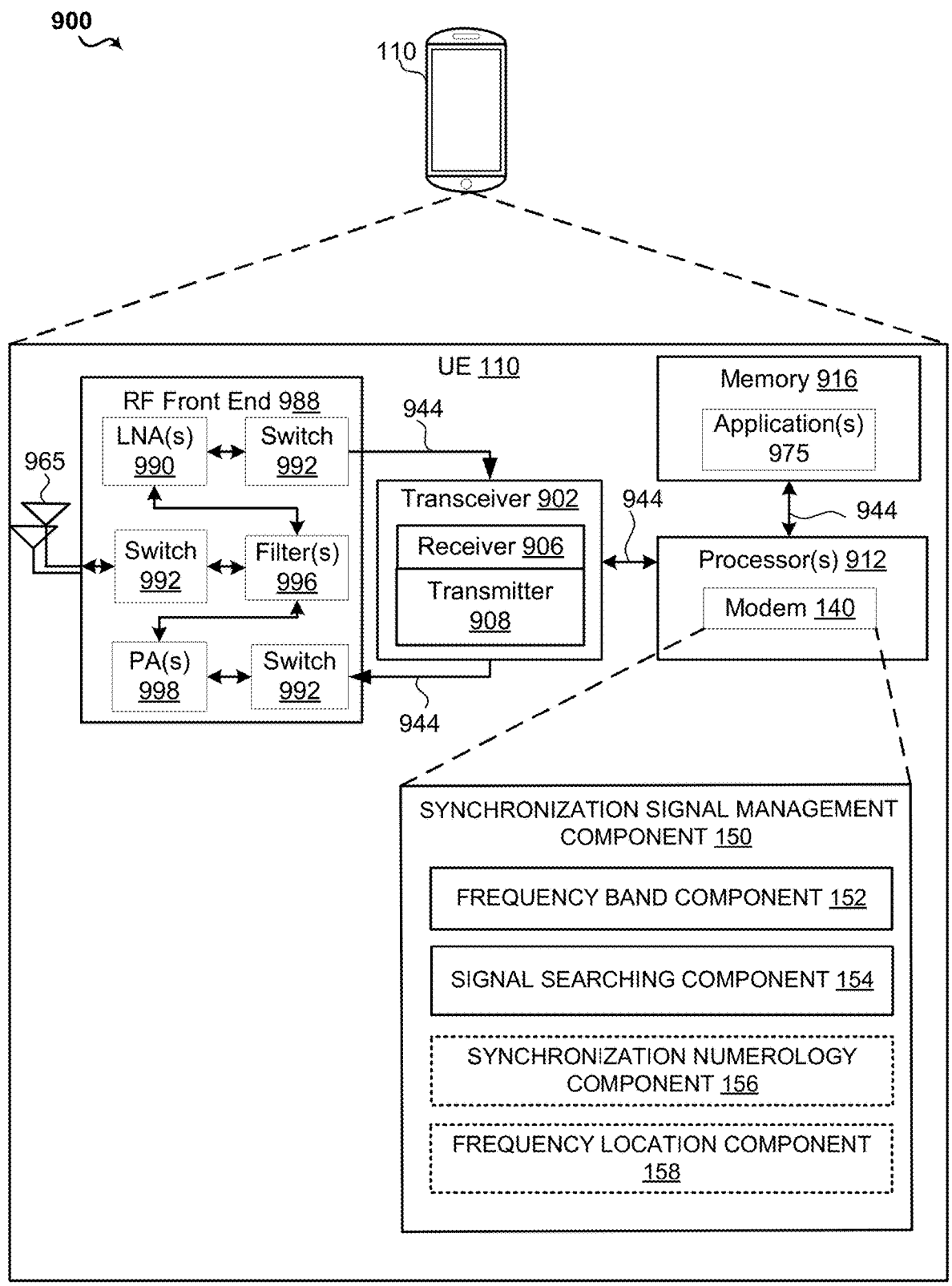
FIG. 9 is a schematic diagram of example components of a UE for synchronization channel design and signaling, according to one or more of the presently described aspects.

Referring to FIG. 9, one example of an implementation of UE 110 may include a variety of components, some of which have already been described above, but including components such as one or more processors 912 and memory 916 and transceiver 902 in communication via one or more buses 944, which may operate in conjunction with modem 140 and synchronization signal management component 150 to enable one or more of the functions described herein related to identifying the synchronization signal location in a frequency band. Further, the one or more processors 912, modem 140, memory 916, transceiver 902, RF front end 988 and one or more antennas 986, may be configured to support voice and/or data calls (simultaneously or non-simultaneously) in one or more radio access technologies.

In an aspect, the one or more processors 912 may include a modem 140 that uses one or more modem processors. The various functions related to synchronization signal management component 150 may be included in modem 140 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 140 associated with synchronization signal management component 150 may be performed by transceiver 902.

Also, memory 916 may be configured to store data used herein and/or local versions of applications 975 or synchronization signal management component 150 and/or one or more of its subcomponents being executed by at least one processor 912. Memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining synchronization signal management component 150 and/or one or more subcomponents, and/or data associated therewith, when UE 110 is operating at least one processor 912 to execute synchronization signal management component 150 and/or one or more subcomponents.

In an aspect, for example, the one or more processors 912 may include a modem 140 that uses one or more modem processors. The various functions related to synchronization channel design and signaling may be included in modem 140 and/or processors 912 and, in an aspect, may be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a transceiver processor associated with transceiver 902. In particular, the one or more processors 912 may implement components included in the synchronization signal management component 150, frequency band component 152, signal searching component 154, synchronization numerology component 156, and/or frequency location component 158.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 105. Additionally, receiver 906 may process such received signals, and also may obtain measurements of the signals, such as, but not limited to, Ec/Io, SNR, RSRP, RSSI, etc. Transmitter 908 may include hardware, firmware, and/or software code executable by a processor for transmitting data, the code comprising instructions and being stored in a memory (e.g., computer-readable medium). A suitable example of transmitter 908 may including, but is not limited to, an RF transmitter.

Moreover, in an aspect, UE 110 may include RF front end 988, which may operate in communication with one or more antennas 965 and transceiver 902 for receiving and transmitting radio transmissions, for example, wireless communications transmitted by at least one base station 105 or wireless transmissions transmitted by UE 110. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

In an aspect, LNA 990 can amplify a received signal at a desired output level. In an aspect, each LNA 990 may have a specified minimum and maximum gain values. In an aspect, RF front end 988 may use one or more switches 992 to select a particular LNA 990 and its specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and its specified gain value based on a desired gain value for a particular application.

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 902 to operate at a specified frequency and power level based on the UE configuration of the UE 110 and the communication protocol used by modem 140.

In an aspect, modem 140 can be a multiband-multimode modem, which can process digital data and communicate with transceiver 902 such that the digital data is sent and received using transceiver 902. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 10:
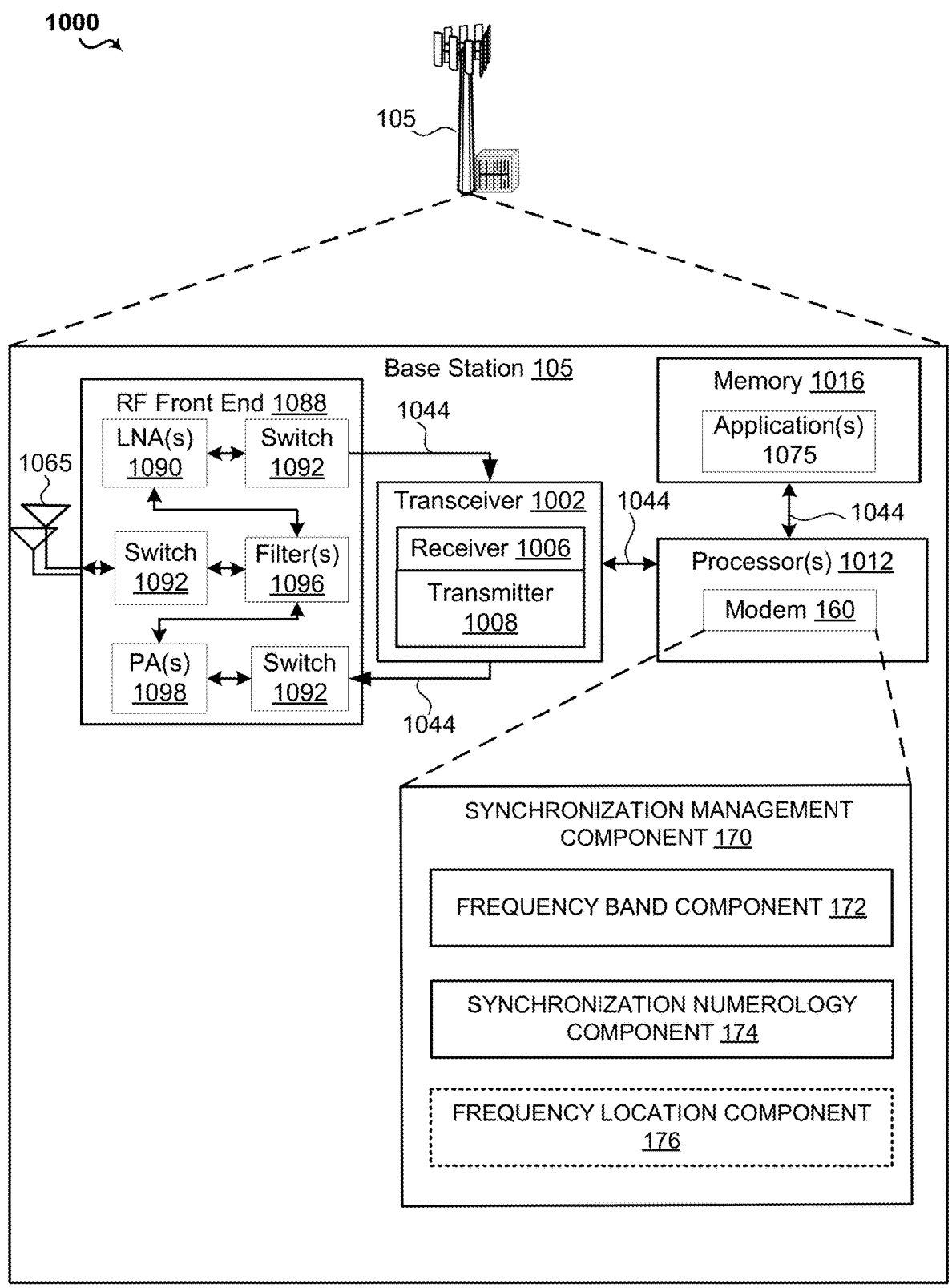
FIG. 10 is a schematic diagram of example components of a base station for synchronization channel design and signaling, according to one or more of the presently described aspects.

Referring to FIG. 10, one example of an implementation of a base station 105 may include a variety of components, some of which have already been described above, but including components such as one or more processors 1012 and memory 1016 and transceiver 1002 in communication via one or more buses 1044, which may operate in conjunction with modem 160 and synchronization management component 170 to enable one or more of the functions described herein, for example, related to identifying the synchronization signal locations or channel raster in a frequency band. Further, the one or more processors 1012, modem 160, memory 1016, transceiver 1002, RF front end 1088 and one or more antennas 1065, may be configured to support voice and/or data calls (simultaneously or non-simultaneously) in one or more radio access technologies.

In an aspect, the one or more processors 1012 may include a modem 160 that uses one or more modem processors. The various functions related to synchronization management component 170 may be included in modem 160 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 160 associated with synchronization management component 170 may be performed by transceiver 1002.

Also, memory 1016 may be configured to store data used herein and/or local versions of applications 1075 or synchronization management component 170 and/or one or more of its subcomponents being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining synchronization management component 170 and/or one or more subcomponents, and/or data associated therewith, when base station 105 is operating at least one processor 1012 to execute synchronization management component 170 and/or one or more subcomponents.

In an aspect, for example, the one or more processors 1012 may include a modem 160 that uses one or more modem processors. The various functions related to synchronization channel design and signaling may be included in modem 160 and/or processors 1012 and, in an aspect, may be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a transceiver processor associated with transceiver 1002. In particular, the one or more processors 1012 may implement components included in the synchronization management component 170, frequency band component 172, synchronization numerology component 174, and/or frequency location component 176.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a RF receiver. In an aspect, receiver 1006 may receive signals transmitted by at least one UE 110. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data or synchronization signals, the code comprising instructions and being stored in a memory (e.g., computer-readable medium). A suitable example of transmitter 1008 may including, but is not limited to, an RF transmitter.

Moreover, in an aspect, the base station 105 may include RF front end 1088, which may operate in communication with one or more antennas 1065 and transceiver 1002 for receiving and transmitting radio transmissions, for example, wireless communications received from at least one UE 110 or wireless transmissions transmitted to UE 110. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver may be tuned to operate at specified frequencies such that the base station 105 can communicate with, for example, one or more UE 110 or one or more cells associated with the base stations 105. In an aspect, for example, modem 160 can configure transceiver 1002 to operate at a specified frequency and power level and the communication protocol used by modem 160.

In an aspect, modem 160 can be a multiband-multimode modem, which can process digital data and communicate with transceiver 1002 such that the digital data is sent and received using transceiver 1002. In an aspect, modem 160 can be multiband and be configured to support multiple frequency bands for a specific communications protocol. In an aspect, modem 160 can be multimode and be configured to support multiple operating networks and communications protocols. In an aspect, modem 160 can control one or more components of the base station 105 (e.g., RF front end 1088, transceiver 1002) to enable transmission and/or reception of signals from the UE 110 based on a specified modem configuration. In an aspect, the modem configuration can be based on the mode of the modem and the frequency band in use.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A user equipment (UE) for wireless communications, comprising:
    means for identifying a frequency band in a subset of frequency bands supported by the UE;
    means for identifying a synchronization numerology used for the subset of frequency bands; and
    means for searching for at least one synchronization signal having the identified synchronization numerology at the identified frequency band.

2. The UE of claim 1, wherein the synchronization numerology corresponding to the subset of frequency bands and the synchronization numerology corresponding to another subset of frequency bands supported by the UE are different.

3. The UE of claim 1, wherein the synchronization numerology corresponding to the subset of frequency bands and the synchronization numerology corresponding to another subset of frequency bands supported by the UE are same.

4. The UE of claim 1, wherein the synchronization numerology is a data channel numerology or a control channel numerology.

5. The UE of claim 1, wherein the synchronization numerology is 15 kHz or a multiple of 15 kHz.

6. The UE of claim 1, further comprising:
    means for receiving the at least one synchronization signal in a combined slot.

7. The UE of claim 6, wherein the combined slot includes two or more slots without at least a downlink common burst or an uplink common burst between the two or more slots.

8. A user equipment (UE) for wireless communications, comprising:
    means for identifying a frequency band supported by the UE;
    means for identifying one or more frequency locations based on the identified frequency band, wherein the one or more frequency locations are a subset of synchronization raster points used for synchronization signal transmission; and
    means for searching for at least one synchronization signal based on the one or more identified frequency locations.

9. The UE of claim 8, wherein the subset of synchronization raster points includes known frequency locations to the UE.

10. The UE of claim 8, wherein the one or more frequency locations comprises at least two frequency locations, and wherein a spacing between two frequency locations of the at least two frequency locations is equal to or larger than a synchronization channel raster.

11. The UE of claim 8, wherein the frequency band is in a subset of frequency bands that are supported by the UE.

12. The UE of claim 11, wherein the subset of the frequency bands only includes one of frequency bands with a minimum system bandwidth or frequency bands with a same synchronization bandwidth upper boundary.

13. The UE of claim 11, wherein each frequency band of the subset of the frequency bands has a known synchronization numerology.

14. The UE of claim 11, wherein the subset of the frequency bands includes frequency bands having at least one known synchronization channel raster.

15. The UE of claim 8, wherein the subset of synchronization raster points includes synchronization raster points having a synchronization channel raster corresponding to a known decimation factor.

16. A base station for wireless communications, comprising:
    means for identifying a frequency band in a subset of frequency bands supported by a user equipment (UE), wherein the identified frequency belongs to a band category supported by the UE;
    means for identifying a synchronization numerology of at least one synchronization signal used for the subset of frequency bands; and
    means for transmitting at least one synchronization signal having the identified synchronization numerology at the identified frequency band,
    wherein the synchronization signal is at the identified frequency band in the supported band category,
    wherein, for the supported band category, data or control channel numerology is a multiple of the synchronization numerology.

17. The base station of claim 16, wherein the synchronization numerology corresponding to the subset of frequency bands and the synchronization numerology corresponding to another subset of frequency bands supported by the UE are different.

18. The base station of claim 16, wherein the synchronization numerology corresponding to the subset of frequency bands and the synchronization numerology corresponding to another subset of frequency bands supported by the UE are same.

19. The base station of claim 16, wherein the synchronization numerology is a data channel numerology or a control channel numerology.

20. The base station of claim 16, wherein the synchronization numerology is 15 kHz or a multiple of 15 kHz.

21. The base station of claim 16, wherein the means for transmitting at least one synchronization signal comprises means for transmitting at least one synchronization signal in a combined slot.

22. The base station of claim 21, wherein the combined slot includes two or more slots without at least a downlink common burst or an uplink common burst between the two or more slots.

23. A base station for wireless communications, comprising:
 means for identifying a frequency band supported by a user equipment (UE);
 means for identifying one or more frequency locations based on the identified frequency band, wherein the one or more frequency locations are a subset of synchronization raster points used for synchronization signal transmission; and
 means for transmitting at least one synchronization signal based on the one or more identified frequency locations.

24. The base station of claim 23, wherein the subset of synchronization raster points includes known frequency locations to the UE.

25. The base station of claim 23, wherein the one or more frequency locations comprises at least two frequency locations, and wherein a spacing between two frequency locations of the at least two frequency locations is equal to or larger than a synchronization channel raster.

26. The base station of claim 23, wherein the frequency band is in a subset of frequency bands that are supported by the UE.

27. The base station of claim 26, wherein the subset of the frequency bands only includes one of frequency bands with a minimum system bandwidth or frequency bands with a same synchronization bandwidth upper boundary.

28. The base station of claim 26, wherein each frequency band of the subset of the frequency bands has a known synchronization numerology.

29. The base station of claim 26, wherein the subset of the frequency bands includes frequency bands having at least one known synchronization channel raster.

30. The base station of claim 23, wherein the subset of synchronization raster points includes synchronization raster points having a synchronization channel raster corresponding to a known decimation factor.

* * * * *